United States Patent
Kodaira et al.

(10) Patent No.: US 7,981,494 B2
(45) Date of Patent: Jul. 19, 2011

(54) OPTICAL INFORMATON RECORDING MEDIUM

(75) Inventors: Takuo Kodaira, Gunma (JP); Isao Matsuda, Gunma (JP); Takeshi Otsu, Gunma (JP); Fumi Hara, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 613 days.

(21) Appl. No.: 12/051,627

(22) Filed: Mar. 19, 2008

(65) Prior Publication Data

US 2008/0260984 A1 Oct. 23, 2008

(30) Foreign Application Priority Data

Mar. 20, 2007 (JP) ................................. 2007-072520
Feb. 7, 2008 (JP) ................................. 2008-027142

(51) Int. Cl.
B32B 3/02 (2006.01)

(52) U.S. Cl. .................. 428/64.1; 428/64.4; 430/270.14

(58) Field of Classification Search .......................... None
See application file for complete search history.

(56) References Cited

U.S. PATENT DOCUMENTS 5,855,979 A * 1/1999 Umehara et al. ............. 428/64.1
2005/0219997 A1* 10/2005 Morita et al. ............. 369/275.4

FOREIGN PATENT DOCUMENTS

JP 2003-303442 10/2003
JP 2005-297406 10/2005

* cited by examiner

*Primary Examiner* — Elizabeth Mulvaney
(74) *Attorney, Agent, or Firm* — Law Offices of Katsuhiro Arai

(57) ABSTRACT

In a write-once optical information recording medium including a substrate, a groove-shaped track such as a guiding groove, and an optical recording layer containing an organic dye material and disposed on the guiding groove, wherein information is recorded by irradiating a short-wavelength laser beam from a surface of the optical recording layer opposite the substrate, and the information can be reproduced by reading a change in the reflected light of a short-wavelength laser beam after the information recording, an unrecorded portion of the optical recording layer has a lower reflectance than a pit portion formed after recording to a portion of the optical recording layer, the optical recording layer has a refractive index n in the range of about 1.2 to about 2.1 before recording and an extinction coefficient k in the range of about 0.01 to about 0.7 before recording, and n+k is in the range of about 1.4 to about 2.1.

11 Claims, 5 Drawing Sheets

OPTICAL INFORMATON RECORDING MEDIUM

BACKGROUND OF THE INVENTION

1. Field of the Invention

The present invention relates to an optical information recording medium to which and from which recording and reproduction can be performed by irradiating a short-wavelength laser beam.

2. Description of the Related Art

An example of an optical information recording medium in which an organic dye is used as a recording material is a write-once optical information recording medium. This is an optical information recording medium in which information has been recorded, and the recorded information is reproduced by irradiating a laser beam emitted from a semiconductor laser having a wavelength in the range of 750 to 830 nm, i.e., a red laser beam. First, write-once CD (i.e., CD-Recordable (CD-R)) discs having a recording capacity of 650 MB or 700 MB were developed. Subsequently, write-once DVD (i.e., DVD-R/+R) discs having a recording capacity of 4.7 GB were developed for which a short-wavelength red laser beam is used, the laser beam having a wavelength in the range of 640 to 680 nm, which is shorter than the above wavelength. These CD-R discs and DVD-R/+R discs have been widely used. The recording polarity of these CD-R discs and DVD-R/+R discs is of a high-to-low type (hereinafter referred to as "HTL type"). More specifically, in this HTL type, an unrecorded portion where a pit is to be formed has a high reflectance, and the pit portion formed after recording has a low reflectance.

As an optical information recording medium having a larger capacity, optical discs have been developed to which and from which recording and reproduction can be performed using a blue-violet laser beam having a wavelength in the range of about 350 to 500 nm (for example, about 405 nm), which is shorter than the wavelength of the conventional short-wavelength red laser beam. In 2006, organic HD DVD-R discs including an optical recording layer made of an organic dye were commercialized. These organic HD DVD-R discs have a recording capacity of 15 GB in a single layer and recording into and reproduction from the organic HD DVD-R discs are performed using a laser beam having a wavelength of 405 nm. Furthermore, write-once inorganic blu-ray discs (i.e., inorganic BD-R) including an optical recording layer made of an inorganic material were also commercialized, and the recording capacity in a single layer thereof is further increased and recording and reproduction are performed using a laser beam having a wavelength of 405 nm. In these organic HD DVD-R discs and inorganic BD-R discs, recording is performed along a groove as in the DVD-R/+R discs. The recording polarity of the organic HD DVD-R discs is of a low-to-high type (hereinafter referred to as "LTH type"). More specifically, in this LTH type, an unrecorded portion where a pit is to be formed has a low reflectance, and the pit portion formed after recording has a high reflectance. On the other hand, the recording polarity of the write-once inorganic blu-ray discs is of the HTL type as in the DVD-R/+R discs.

As shown in FIG. 1, an HD DVD-R disc 1 that has already been commercialized includes a disc-shaped substrate 2 having a groove 7 serving as a guiding groove on a principal surface thereof. A land 8 is provided between a pair of concentric sections of the groove 7 of the substrate 2. An optical recording layer 3 is formed on the upper surface of the disc-shaped substrate 2 having the groove 7 thereon. A light-reflecting layer 4 is formed on the optical recording layer 3. A dummy substrate 6, which also functions as a protective layer, is laminated on the upper surface of the light-reflecting layer 4, with an adhesive layer 5 therebetween. In the HD DVD-R disc 1 thus obtained, recording is performed by irradiating a laser beam 9 onto the optical recording layer 3 along the groove 7, which is a spiral guiding groove provided on the substrate 2. Reproduction from the HD DVD-R disc 1 into which recording has been performed along the groove 7 is performed by irradiating a laser beam 9 along the groove 7 and reading the recorded signals from the reflected light of the laser beam 9. That is, recording and reproduction are performed along the groove 7. The recording polarity of this HD DVD-R disc 1 is of the LTH type in which an unrecorded portion where a pit is to be formed has a low reflectance and the pit portion formed after recording has a high reflectance.

For example, according to Japanese Unexamined Patent Application Publication No. 2005-297406, in order to realize a high-definition HD DVD-R disc in a wavelength range comparable to that of a short-wavelength laser beam using an organic dye for an optical recording layer, the optical recording layer is formed using an organic dye which has an anion portion and a cation portion and whose maximum absorption wavelength range is present at the longer wavelength side of the wavelength of a short-wavelength laser beam to be irradiated onto the optical recording layer.

FIG. 2 shows a write-once organic blu-ray disc (hereinafter referred to as "organic BD-R") in which an organic dye is used for an optical recording layer. In an organic BD-R disc 11, a light-reflecting layer 4, an optical recording layer 3, and a protective layer 5 are sequentially formed on a surface of a disc-shaped substrate 2, the surface having a guiding groove thereon. Furthermore, a cover layer 6b is bonded to the upper surface of the protective layer 5, with an adhesive layer 6a therebetween. In this organic BD-R disc 11, the spiral guiding groove provided on the substrate 2 functions as a groove 7', and a portion disposed between a pair of concentric sections of the groove 7' is a land 8'. Recording is performed by irradiating a laser beam 9 onto the optical recording layer 3 in the groove 7' or the optical recording layer 3 on the land 8'. Reproduction from the organic BD-R disc 11 into which recording has been performed along the groove 7' or along the land 8' is performed by irradiating a laser beam 9 along the groove 7' or land 8' and reading the recorded signals from the reflected light of the laser beam 9. For example, in order to realize a high-definition organic BD-R disc in a wavelength range comparable to that of a short-wavelength laser beam using an organic dye for an optical recording layer, Japanese Unexamined Patent Application Publication No. 2003-303442 (document '442) discloses an invention in which the ranges of the refractive index (n) of the optical recording layer before recording, the attenuation coefficient (k) of the optical recording layer before recording, and the amounts of change in n and k before recording and after recording, i.e., Δn and Δk, are specified.

However, the recording polarity of the organic BD-R disc described in document '442 is of the HTL type in which an unrecorded portion where a pit is to be formed has a high reflectance and the pit portion formed after recording has a low reflectance. In an organic BD-R disc including an optical recording layer made of an organic dye, in order to improve the recording sensitivity, a large attenuation coefficient (k) of the optical recording layer before recording is advantageous because a large amount of a laser beam is absorbed. However, such a large attenuation coefficient (k) before recording cannot be realized, which is a problem to be solved.

SUMMARY OF THE INVENTION

The present invention relates to a novel write-once optical information recording medium such as an organic BD-R disc in which an organic dye is used and which has the LTH-type recording polarity. In particular, an object of the present invention is to provide a write-once optical information recording medium, such as an organic BD-R disc, wherein when a laser beam for reproduction tracks a track including a guiding groove and failure of following does not occur, while the write-once optical information recording medium has the LTH-type recording polarity.

Another object of the present invention is to provide an optical information recording medium in which the recording sensitivity during recording can be improved to decrease the recording power.

Another object of the present invention is to provide a write-once optical information recording medium, such as an organic BD-R disc in which degradation of the degree of modulation, which is a signal quality showing the accuracy of reproduction of recorded signals, is suppressed.

Another object of the present invention is to provide an optical information recording medium into which and from which high-speed, high-capacity, and high-definition recording and reproduction compatible with irradiation of a short-wavelength laser beam can be performed.

A novel embodiment is due to the development of an optical information recording medium in which land recording is performed and which has the LTH-type recording polarity rather than the conventional HTL-type recording polarity. As a result of intensive study, the following novel concepts have been found: Regarding the refractive index (n) and the extinction coefficient (k) of an optical recording layer, when n+k is 2.1 or less, the degree of modulation is not decreased. In such a case, a problem of tracking failure, which is easily generated by an increase in the reflectance in the LTH-type recording polarity in land recording, can also be prevented. This finding led to the realization of embodiments of the present invention.

According to a first technical embodiment of the present invention, in a write-once optical information recording medium including a disc-shaped substrate, a spiral or ring-shaped groove disposed on a surface of the substrate, and an optical recording layer containing an organic dye material as a main component and disposed on a surface of the groove, wherein information is recorded by irradiating a short-wavelength laser beam along the groove or along a land between sections of the groove from a surface of the optical recording layer opposite the substrate, and the information can be reproduced by reading a change in the reflected light of a short-wavelength laser beam after the information recording, an unrecorded portion of the optical recording layer has a lower reflectance than a pit portion formed after recording to a portion of the optical recording layer, and the optical recording layer has a refractive index n in the range of about 1.2 to about 2.1 before recording and an extinction coefficient k in the range of about 0.01 to about 0.7 before recording, and n+k is in the range of about 1.4 to about 2.1. The above objects are achieved by this structure.

According to the first technical embodiment, regarding the refractive index n and the extinction coefficient k of the optical recording layer, n+k is about 2.1 or less, n is in the range of about 1.2 to about 2.1, and k is in the range of about 0.01 to about 0.7. Consequently, the first technical aspect of the present invention can provide a write-once optical information recording medium, such as an organic BD-R disc, in which a reproducing laser beam can reliably follow a recorded track, tracking is satisfactorily performed, and after recording is performed by irradiating a short-wavelength laser beam, reproduction is performed by irradiating a short-wavelength laser beam.

In particular, the optical recording layer is composed of an organic dye layer which may have an appropriate optical thickness. Thereby, the refractive index n can be controlled to be about 2.1 or less, and n+k can be specified within the range of about 1.4 to about 2.1. As a result, tracking can be satisfactorily maintained.

By controlling the refractive index n of the optical recording layer to be about 2.1 or less, the optical recording layer can have an appropriate optical thickness. By controlling the refractive index n of the optical recording layer to be about 1.2 or more, the optical recording layer can have an appropriate optical thickness.

The extinction coefficient k of the optical recording layer is controlled to be about 0.01 or more. Accordingly, the amount of laser beam absorbed by the optical recording layer is sufficient, and thus, the recording sensitivity during recording can be improved to decrease the recording power. In addition, the extinction coefficient k of the optical recording layer is controlled to be about 0.7 or less. Accordingly, the optical recording layer does not excessively absorb a laser beam, and thus, a decrease in the light intensity at a detector can be prevented.

According to a second technical embodiment of the present invention, in the optical information recording medium according to the first technical embodiment, the optical recording layer is preferably composed of an organic dye material film, and the optical density (OD value) of the optical recording layer at the absorption maximum wavelength is preferably about 0.3 or less. The above objects are achieved by this structure.

According to the second technical embodiment, by adjusting the optical density (OD value) of the optical recording layer at the absorption maximum wavelength to be about 0.3 or less, the optical recording layer can have an appropriate optical thickness. By determining an appropriate optical thickness of the optical recording layer in combination with the first technical aspect, a write-once optical information recording medium, such as an organic BD-R disc, can be provided in which a reproducing laser beam can reliably follow a recorded track, tracking failure can be prevented, and after recording is performed by irradiating a short-wavelength laser beam, reproduction is performed by irradiating a short-wavelength laser beam.

According to a third technical embodiment of the present invention, in the optical information recording medium according to the first or second technical embodiment, the short-wavelength laser beam used for recording or reproducing information is a laser beam having a wavelength in the range of about 350 to about 500 nm. The above objects are achieved by this structure.

The third technical embodiment can provide an optical information recording medium in which high-speed, high-capacity, and high-definition recording and reproduction that are compatible with irradiation of a short-wavelength laser beam can be performed.

DESCRIPTION OF THE PREFERRED EMBODIMENTS

A concept novel to embodiments of the present invention is that from the standpoint of an improvement in characteristics, it would be advantageous if the recording polarity given in document '442 was of the LTH type, which is the same as that in organic HD DVD-R discs, rather than of the HTL type. In addition, another novel concept is that recording in which the thickness and the volume of a dye film, such as is contained in a groove 7' when viewed from the substrate side, are increased would increase the absorption efficiency.

As a result of the development of a novel organic BD-R disc based on the above concepts, descriptions of embodiments of the present invention have been made. This organic BD-R disc has an LTH-type recording polarity, and land recording is performed in this organic BD-R disc. Accordingly, this organic BD-R disc differs from a known write-once optical information recording medium that is of the HTL-type recording polarity. Therefore, it is advantageous to ensure the performance of the disc by designing a recording material and a disc shape that are different from known materials and shapes.

Regarding known organic BD-R discs, in the HTL-type recording, the reflectance of a recorded portion compared to a reproduction signal is decreased during reproduction after recording. On the other hand, in the LTH-type recording, since the reflectance of a recorded portion compared to a reproduction signal is increased during reproduction after recording, following during tracking often fails.

Figure 1:
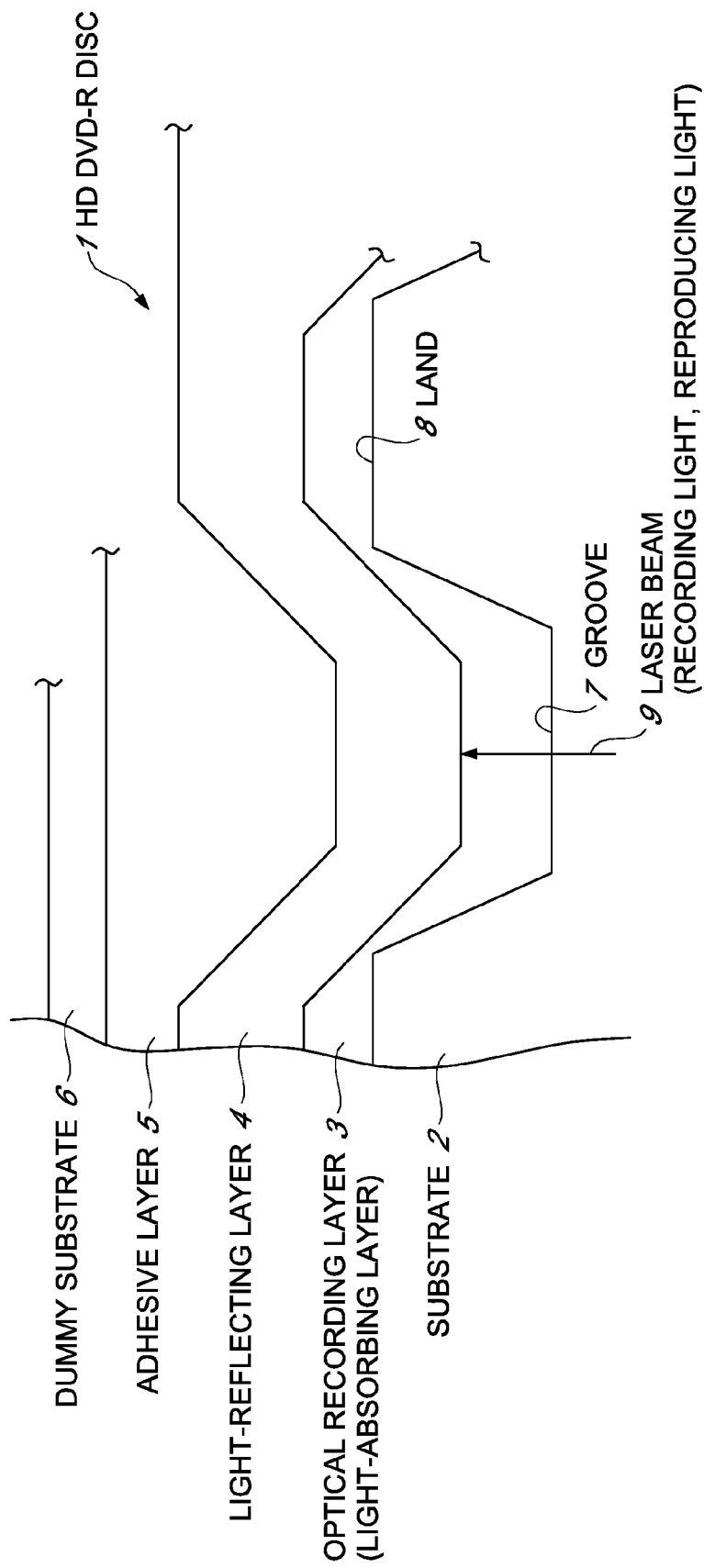
FIG. 1 is a cross-sectional view illustrating a known HD DVD-R disc.
Figure 2:
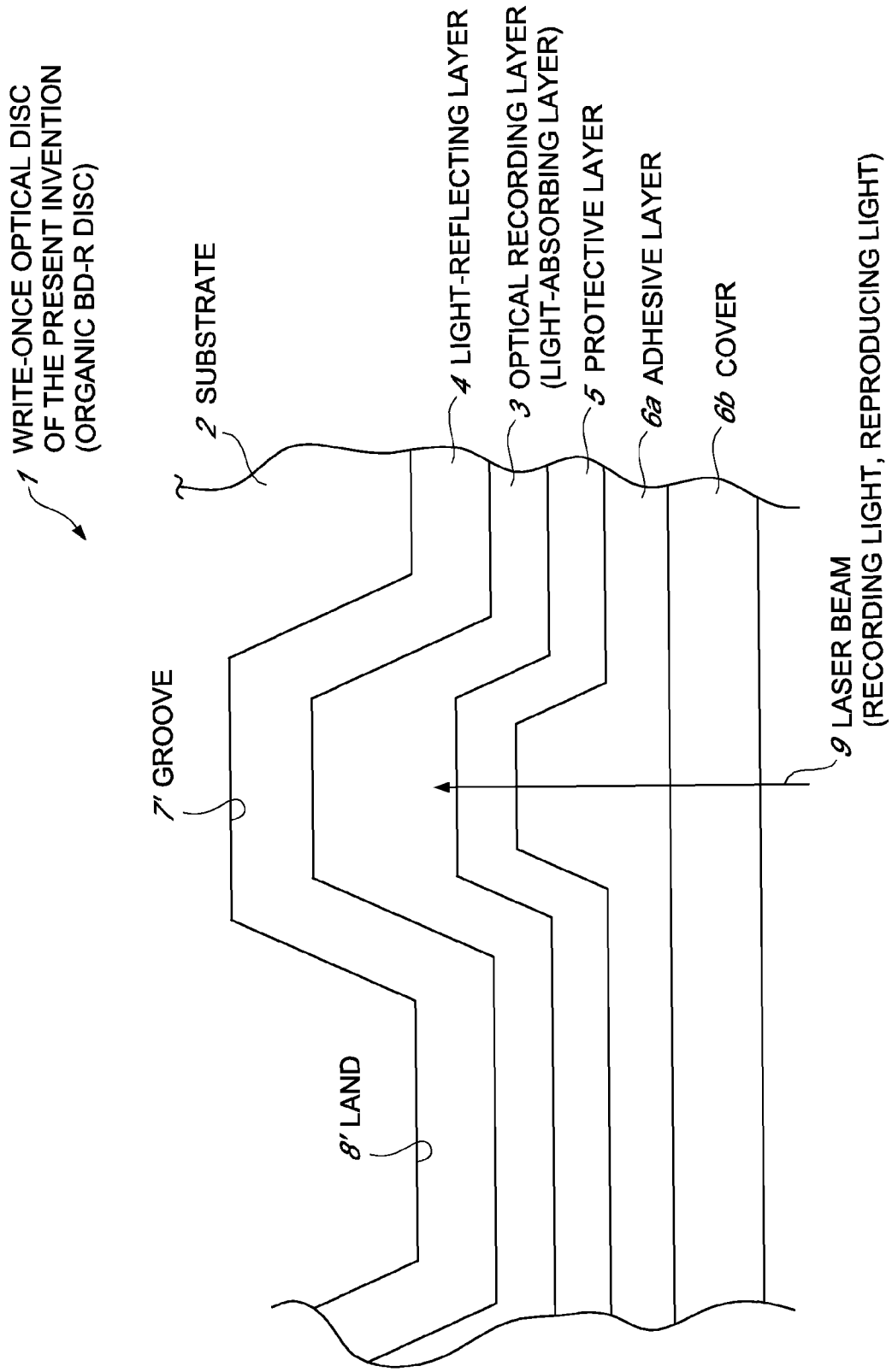
FIG. 2 is a cross-sectional view illustrating a write-once optical information recording medium according to an embodiment of the present invention.

The outline of the structure of an embodiment of the present invention will now be described with reference to FIG. 2. In an organic BD-R disc 11 of the present invention, a light-reflecting layer 4, an optical recording layer 3, and a protective layer 5 are sequentially provided on a surface of a disc-shaped substrate 2 with a thickness of 1.1 mm, the surface having a spiral guiding groove thereon. Furthermore, a cover layer 6b is bonded to the upper surface of the protective layer 5, with an adhesive layer 6a made of an adhesive therebetween. In the organic BD-R disc 11 having the above structure, the spiral guiding groove provided on the substrate 2 is a groove 7', and a portion disposed between a pair of concentric sections of the groove 7' is a land 8'. Recording is performed by irradiating a laser beam 9 onto the optical recording layer 3 in the groove 7' or the optical recording layer 3 on the land 8'.

A portion of the optical recording layer 3 that has been irradiated with the laser beam 9 generates heat to a high temperature, thereby performing recording. Recording is performed by a change in the optical reflectance caused by a chemical change and a physical change at the periphery of the portion due to the heat generation. The portion thus changed is referred to as a portion where a pit is formed. The shape of the pit is controlled by an irradiation control technique of the laser beam 9. Thus, recording with desired signals can be performed. Such recording is known in the art and a further description is omitted. Reproduction from the organic BD-R disc 11 into which recording has been performed along the groove 7' is performed by irradiating a laser beam 9 along the groove 71 and reading the recorded signals from the reflected light of the laser beam 9. Reproduction from the land 8' may similarly be performed by irradiating a laser beam along the land 8'.

Figure 3A:
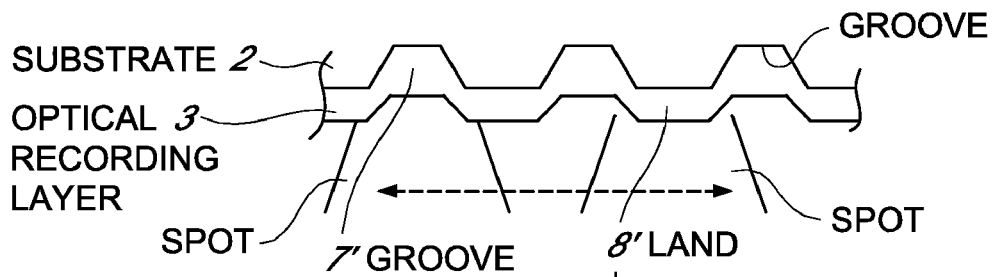
FIGS. 3A to 3C are explanatory views that illustrate a principle by which a track is followed by a short-wavelength laser beam.
Figure 3B:
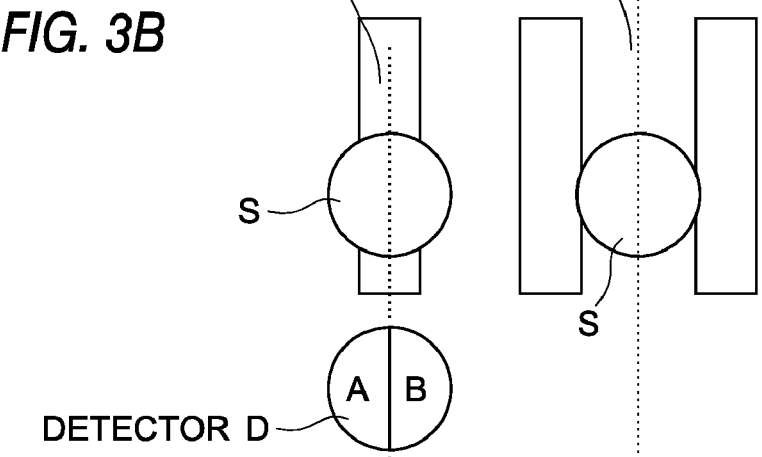
Figure 3C:
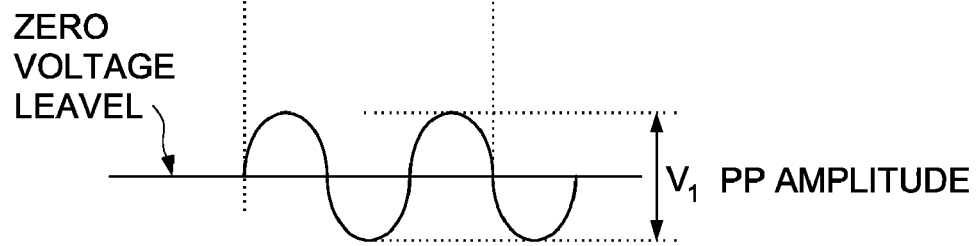

Regarding the optical information recording medium having the above structure, a description will be made of a principle by which a track is followed by a short-wavelength laser beam with reference to FIGS. 3A to 3E. FIG. 3A is a cross-sectional view that schematically shows the optical information recording medium. FIG. 3B is a schematic view showing the positional relationship between a groove 7' and a spot diameter of a laser beam, viewed from the substrate surface of the optical information recording medium aligned with the schematic view of FIG. 3A. A detector D that detects reflected light of an irradiated laser beam is also shown in the figure. FIG. 3C is a schematic diagram showing a push-pull (PP) signal of the detection result of the detector D aligned with the position of the spot of the laser beam shown in FIG. 3B.

As shown in FIG. 3A, an optical recording layer 3 is provided on a surface of a substrate 2, the surface having a groove 7' serving as a guiding groove thereon. A land 8' is provided on the surface of the substrate 2 at both sides of each concentric section of the groove 7'. Other layers may also be provided on substrate 2, such as layers 4-6b, illustrated in FIG. 2. The unrecorded optical recording layer 3 of this optical information recording medium is irradiated with a short-wavelength laser beam in a tracking-off state. As a result of this irradiation, reflected light of the short-wavelength laser beam that is irradiated while reciprocating around the land 8' and the groove 7' is detected by the pick-up detector D, illustrated in FIG. 3B. The reflected light simultaneously undergoes photo-electric conversion and is measured as a push-pull (PP) signal with an oscilloscope. As a result of this measurement, the push-pull (PP) signal shown in FIG. 3C is detected as a voltage. When a substantially sinusoidal waveform is obtained, as illustrated in FIG. 3c, following of a track by a short-wavelength laser beam is performed normally. More specifically, when tracking is turned to be in an on state in the state shown in FIG. 3B and a spot S of the laser beam follows the groove 7', the operation value of reflected light from A and B, which are obtained by dividing the detector D into two semicircles, is represented by PP=A−B=0.

Figure 3D:
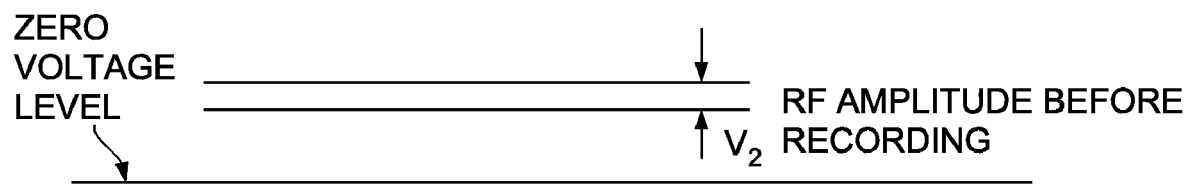
FIGS. 3D and 3E are explanatory views continuing from FIGS. 3A to 3C.

This state will be described with reference to the schematic diagram of the amplitude level of FIG. 3D. In the case where the RF amplitude before recording is a small value as shown in FIG. 3D, this detection system functions normally. The actual PP signal is normalized and processed in a circuit.

Operational expressions for normalizing the above PP signal and the RF signal are given below. NPPb represents a normalized NPP signal before recording, and NPPa represents a normalized NPP signal after recording.

NPPb=PP amplitude $V1[V]$/RF amplitude before recording $V2/2$ $[V]$

NPPa=PP amplitude $V1[V]$/RF amplitude after recording $V3/2$ $[V]$

Figure 3E:
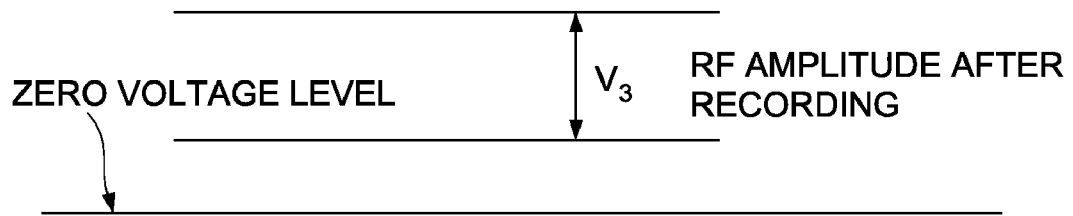

Regarding the PP value (NPPb) normalized by a reproduction RF signal in the case where tracking is turned to be in the off state before recording, as shown in FIG. 3D, since the value of amplitude of the RF signal is small, NPPb is a large value as a result of the operation. Accordingly, this detection system functions normally as described above. However, after recording is performed on the optical recording layer 3, as shown in FIG. 3E, the reflectance of the recorded portion to a reproduction RE signal in the case where tracking is turned to be in the off state is increased. As a result, the value of NPPa is smaller than that of NPPb, and thus tracking cannot be performed. More specifically, when tracking is turned to be in an on state in the state shown in FIG. 3B and the spot S of the laser beam follows the groove 7', the operation of reflected light from A and B, which are obtained by dividing the detector D into two semicircles, is represented by PP=A−B≠0. Accordingly, this detection system does not function normally, and thus tracking cannot be performed.

A concept novel to embodiments of the present inventors is that in order to prevent occurrence of the above case where tracking cannot be performed, after a detected signal is passed through a low-pass filter of 30 kHz at a reproduction power of a short-wavelength laser beam of 0.25 mW, the PP amplitude $V_1$ should be 0.2 [V] or more, that is, $V_1[V] \geq 0.2$ [V]. To achieve this, it has been found that, appropriately, the refractive index n of a dye film constituting an optical recording layer before recording is in the range of 1.2 to 2.1, and the extinction coefficient k of the dye film before recording is in the range of 0.01 to 0.7.

Furthermore, it has been found that it may be advantageous if the optical recording layer is formed using an organic dye material such that the optical density (OD value) (absorbance) of the optical recording layer composed of an organic dye thin film at the absorption maximum wavelength in a short-wavelength laser beam having a wavelength of 405 mm is 0.3 or less.

Examples of the dye used in the present invention include, but are not particularly limited to, azo dyes and metal complexes thereof; methine dyes and metal complexes thereof; azomethine dyes and metal complexes thereof; other metal complexes; cyanine dyes; merocyanine dyes; squarylium dyes; stryl dyes; coumarin dyes; phthalocyanine dyes; subphthalocyanine dyes; porphyrin dyes; pyrromethene dyes; oxonol dyes; and dyes that form tautomers.

Figure 4:
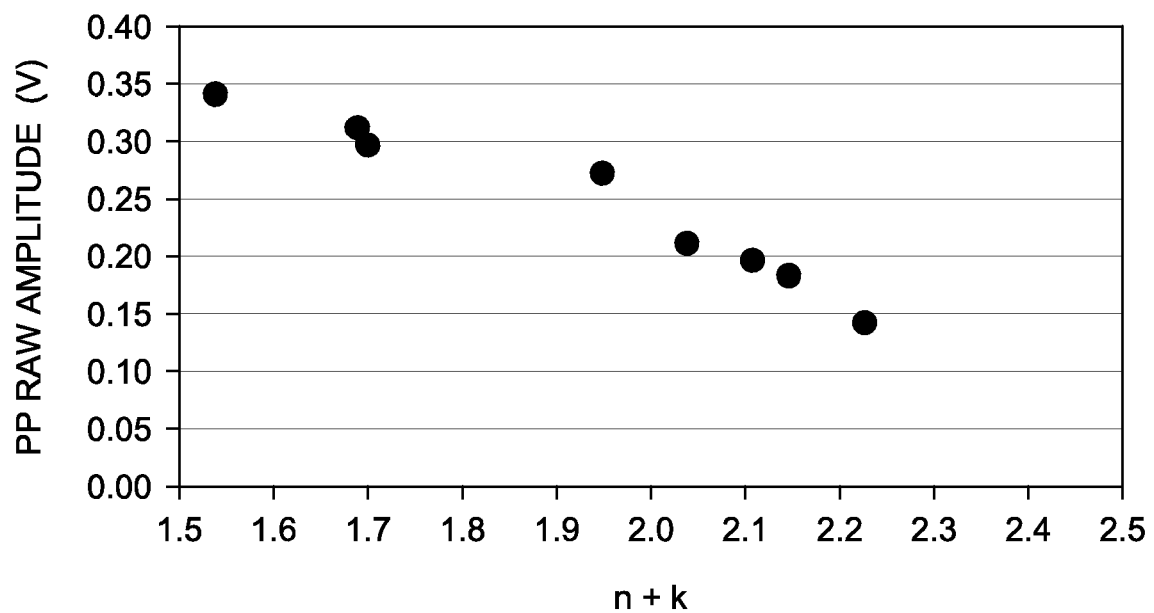
FIG. 4 is a graph showing the relationship between n+k and the PP amplitude before recording.

Ranges of the refractive index n and the extinction coefficient k before recording for which the probability of being unable to perform tracking (probability of servo following being impossible) is very low were examined in addition to observed values of examples described below. Table 1 shows the results. In Table 1, the terms "Chemical Formula 1" to "Chemical Formula 8" represent compounds represented by Chemical Formula 1 to Chemical Formula 8 below. In the column "tracking after recording" in Table 1, when the above-described following of a track could be performed, the compound was evaluated as "A". When the following of a track could not be performed, the compound was evaluated as "13". The definitions of other values are as described above. Referring to Table 1, when the value n+k before recording was 2.04 or less and the PP amplitude $V_1$ [V] before recording was 0.21 [V] or more, the following of a track was evaluated as "A". FIG. 4 is a graph showing values of n+k plotted against PP amplitude $V_1$ [V].

Referring to Table 1 and FIG. 5, in order to satisfy the condition that tracking can be performed, that is, "tracking after recording" is evaluated as "A", the range in which the relationship n+k<2.1 is satisfied and the PP amplitude reference value $V_0$ before recording is 0.20 [V] or more, i.e., $V_0[V] \geq 0.20$ [V] is preferable.

Furthermore, from the standpoint that satisfactory recording sensitivity and degree of modulation are ensured, the refractive index n before recording is preferably in the range of 1.2 to 2.1, and the extinction coefficient k before recording is preferably in the range of 0.01 to 0.7. These preferable ranges also support the relationship $n+k \geq 1.21$.

Furthermore, n>1.2, the thickness d of the optical recording layer composed of an organic dye film <55 nm, and referring to FIG. 5, $V_0[V]>0.25$ [V], and n+k<2.0 or 1.95 are also preferable. A change in the light intensity and the distribution of the light intensity at the detector D caused by interference of reflected light from a land portion and a groove portion depend on the difference between the optical path of the land portion and the optical path of the groove portion. Therefore, it is advantageous to determine the optical path length of the optical recording layer, that is, a value of nd, which is the product of the refractive index n of a dye constituting the optical recording layer before recording and the thickness d of the optical recording layer, to be within an appropriate range.

TABLE 1

| Compound | n | k | n + k | PP raw amplitude [V] | Tracking after recording |
|---|---|---|---|---|---|
| Chemical Formula 1 | 1.28 | 0.41 | 1.69 | 0.31 | A |
| Chemical Formula 2 | 1.35 | 0.19 | 1.54 | 0.34 | A |
| Chemical Formula 3 | 1.68 | 0.02 | 1.70 | 0.30 | A |
| Chemical Formula 4 | 1.80 | 0.15 | 1.95 | 0.27 | A |
| Chemical Formula 5 | 1.74 | 0.30 | 2.04 | 0.21 | A |
| Chemical Formula 6 | 1.93 | 0.18 | 2.11 | 0.19 | B |
| Chemical Formula 7 | 1.60 | 0.63 | 2.23 | 0.14 | B |
| Chemical Formula 8 | 1.95 | 0.20 | 2.15 | 0.18 | B |

[Chemical Formula 1]

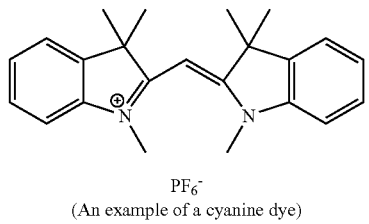

$PF_6^-$ (An example of a cyanine dye)

[Chemical Formula 2]

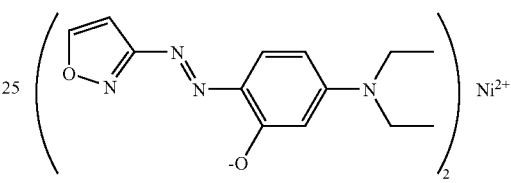

(An example of an azo-metal chelate dye)

[Chemical Formula 3]

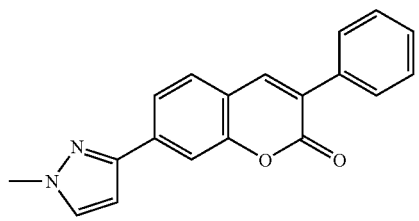

(An example of a coumarin dye)

[Chemical Formula 4]

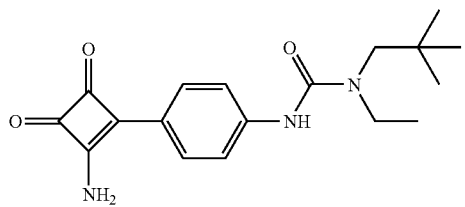

(An example of a squarylium dye)

[Chemical Formula 5]

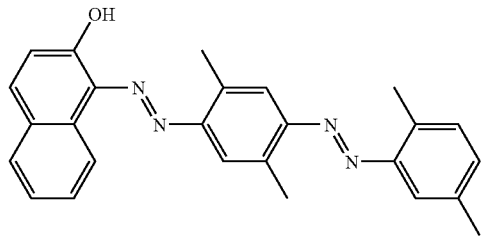

(An example of an azo dye)

TABLE 1-continued

| Compound | n | k | n + k | PP raw amplitude [V] | Tracking after recording |
|---|---|---|---|---|---|

[Chemical Formula 6]

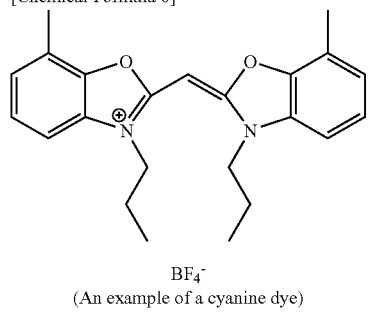

BF$_4^-$ (An example of a cyanine dye)

[Chemical Formula 7]

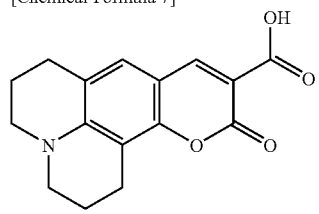

(An example of a coumarin dye)

[Chemical Formula 8]

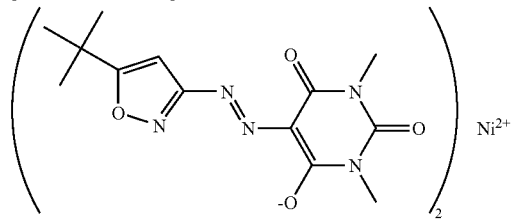

(An example of an azo-metal chelate dye)

The light-transmissive substrate 2 is preferably made of a material that has a refractive index for a laser beam, for example, in the range of about 1.5 to 1.7, that has a high degree of transparency, and that has excellent impact resistance. More specifically, the substrate 2 may be mainly made of a resin plate such as a polycarbonate plate, an acrylic plate, or an epoxy plate. Alternatively, a glass plate may be used.

The optical recording layer 3 is preferably a dye film containing a dye material and provided on the substrate 2. The optical recording layer 3 preferably has a thickness in the range of about 15 to 120 nm. When the optical recording layer 3 is irradiated with a laser beam 9, for example, the molecular structure of the dye is changed. As a result, the refractive index n of the organic dye for the laser beam 9 and the extinction coefficient k of the organic dye are changed by Δn and Δk, respectively. Accordingly, modulation can be achieved by using the differences in the refractive index n and the extinction coefficient k before irradiation and after irradiation of the laser beam 9. Consequently, reproduction with a laser beam can be performed.

The optical recording layer of the present embodiment is an organic dye thin film containing an organic dye material as a main component and functions as an optical thin film. In this thin film, the refractive index n before recording and the extinction coefficient k before recording may be advantageously configured, as described above. Not only in the case where the organic dye thin film is composed of a single dye, but also in the case where the organic dye thin film is composed of a mixture of a plurality types of dyes, the refractive index n before recording and the extinction coefficient k before recording can be configured as in the case where the organic dye thin film is composed of a single dye.

The optical recording layer 3 may be formed as follows: An organic dye material and other optional additives are added to a solvent to prepare a mixed solution. The solution is then applied by for example, spin coating on an upper surface of a doughnut disc-shaped substrate with a thickness of about 1.1 mm, the surface having a spiral guiding groove thereon.

A fluorinated alcohol such as 2,2,3,3-tetrafluoro-1-propanol may be used as the solvent. Alternatively, chloroform, dichloroethane, methyl ethyl ketone, dimethylformamide, methanol, toluene, cyclohexanone, acetylacetone, diacetone alcohol, a cellosolve such as methyl cellosolve, dioxane, and the like may be used alone or in combinations of two or more solvents to the extent that the substrate is not corroded. Alternatively, at least one of these solvents may be used in combination with a fluorinated alcohol.

The light-reflecting layer 4 is a metal film having high thermal conductivity and light reflectivity. The light-reflecting layer 4 may be formed by depositing a metal material such as gold, silver, copper, aluminum, and an alloy thereof by vapor deposition, sputtering, or the like.

The protective layer 5 is made of a transparent inorganic material and deposited by, for example, sputtering.

The cover layer 6b is made of, for example, a light-transmissive resin layer having a thickness of about 0.1 mm. The cover layer 6b is bonded to the substrate via the adhesive layer 6a made of a transparent adhesive. Thus, a predetermined thickness of about 1.2 mm is ensured as a disc.

The above-described organic BD-R disc 11 includes a single optical recording layer 3, a single light-reflecting layer 4, and a single protective layer 5. Alternatively, a plurality of optical recording layers 3, a plurality of light-reflecting layers 4, and a plurality of protective layers 5 may be provided to form a multilayer disc. In such a case, higher-density and higher-capacity recording can be realized.

EXAMPLES

Examples of the present invention will now be described with reference to FIGS. 2 to 5.

Example 1

A spiral guiding groove having a pitch of 0.32 μm was formed on a disc-shaped polycarbonate substrate 2 having an outer diameter of 120 mm and a thickness of 1.1 mm. Alternatively, ring-shaped grooves can be used as long as, for example, a software for inducing tracking can be changed. A light-reflecting layer 4 made of a silver (Ag) alloy was formed by sputtering on the upper surface of the substrate 2, the surface having the guiding groove thereon. Thus, a track corresponding to the guiding groove was formed on the light-reflecting layer 4 so as to have a depth of 45 nm and a width of 160 nm, viewed from the substrate side.

A dye solution prepared by dissolving the compound represented by Chemical Formula 1 (cyanine dye) in 2,2,3,3-tetrafluoro-1-propanol (TFP) was applied on the upper surface of the light-reflecting layer 4 by spin coating and was dried at 80° C. for 30 minutes. Thus, an optical recording layer 3 having a thickness on a groove 7' of 35 nm and a thickness on a land 8' of 15 nm was formed so that the optical density (OD value) of the optical recording layer 3 at the absorption maximum wavelength (λmax) was 0.3. Furthermore, a transparent protective layer 5 made of ZnS—SiO$_2$ was then formed on the upper surface of the optical recording layer 3 by sputtering so as to have a thickness of 20 nm. Subsequently, a cover layer (light-transmissive layer) 6b composed of a polycarbonate sheet having a thickness of 0.1 mm was bonded to the surface of the protective layer 5, with an adhesive layer 6a made of a transparent adhesive therebetween. Accordingly, a write-once optical information recording medium sample of an organic BD-R disc 11 was prepared.

The refractive index n of the optical recording layer 3 of the organic BD-R disc 11 before recording and the extinction coefficient k of the optical recording layer 3 before recording were measured as follows. A disc-shaped polycarbonate substrate having an outer diameter of 120 mm and a thickness of 1.1 mm was prepared. This substrate had a flat top surface and a flat bottom surface. A dye solution prepared by dissolving the compound represented by Chemical Formula 1 above in TFP was applied on the top surface of the substrate by spin coating and was dried at 80° C. for 30 minutes. Thus, a dye thin film having a thickness of 40 nm was formed. The refractive index n and the extinction coefficient k were measured with a measuring device (ETA-RT/UV, manufactured by STEAG ETA-Optik GmbH). According to the results, the refractive index n was 1.28 and the extinction coefficient k was 0.41. After a detected signal was passed through a low-pass filter of 30 kHz at a reproduction power of the main beam of 3-beam of a short-wavelength laser beam of 0.25 mW, the PP amplitude $V_1$ [V] before recording was 0.31 [V].

Furthermore, other samples were also prepared using the compounds represented by Chemical Formula 2, Chemical Formula 3, Chemical Formula 4, Chemical Formula 5, Chemical Formula 6, Chemical Formula 7, and Chemical Formula 8 as in the above sample including the compound represented by Chemical Formula 1 (cyanine dye). The refractive index n and the extinction coefficient k before recording were also measured with a measuring device (ETA-RT/UV, manufactured by STEAG ETA-Optik GmbH) as in the above sample. The measured values are shown in Table 1.

Subsequently, recording was performed on the organic BD-R disc 11 with a commercially available recording/reproduction system (DDU-1000 manufactured by Pulstec Industrial Co., Ltd.) using a short-wavelength laser beam having a wavelength of 405 nm, at a numerical aperture (NA) of 0.85, a recording power of 5.0 mW, and a linear velocity of 4.92 m/s. Reproduction characteristics were evaluated using a short-wavelength laser beam having a wavelength of 405 nm. As a result, following by tracking can be performed. After a detected signal was passed through a low-pass filter of 30 kHz at a reproduction power of the main beam of 3-beam of a short-wavelength laser beam of 0.3 mW, the PP amplitude $V_1$ [V] after recording was 0.23 [V], and the degree of modulation was 0.47.

According to these results, the sum n+k of the refractive index n and the extinction coefficient k before recording was 1.69, and the PP amplitude $V_1$ [V] before recording was 0.31 [V]. This result satisfies the above-mentioned relationship of n+k<2.1 for satisfying $V_0$ [V]≧0.20 [V]. These results are shown in the row of Chemical Formula 1 of Table 1.

Examples 2, 3, 4, and 5

Organic BD-R discs 11 were prepared as in Example 1 except that a compound represented by Chemical Formula 2, Chemical Formula 3, Chemical Formula 4, or Chemical Formula 5 was used instead of the compound represented by Chemical Formula 1. These organic BD-R discs 11 were evaluated as in Example 1. The measurement results are shown in the rows of Chemical Formula 2 to Chemical Formula 5 in Table 1. As shown in Table 1, tracking of all of the organic BD-R discs 11 could be performed.

The sum n+k of the refractive index n and the extinction coefficient k of the organic BD-R discs 11 before recording was 1.54, 1.70, 1.95, and 2.04, and the PP amplitude $V_1$ [V] before recording was 0.34 [V], 0.30 [V], 0.27 [V], and 0.21 [V], respectively. These results satisfy the above-mentioned relationship of n+k<2.1 for satisfying $V_0$[V]≧0.20 [V]. The degree of modulation was 0.40, 0.41, 0.43, and 0.40, respectively.

Comparative Examples 1, 2, and 3

Organic BD-R discs 1 were prepared as in Example 1 except that a compound represented by Chemical Formula 6, Chemical Formula 7, or Chemical Formula 8 was used instead of the compound represented by Chemical Formula 1. These organic BD-R discs 1 were evaluated as in Example 1. The measurement results are shown in the rows of Chemical Formula 6 to Chemical Formula 8 in Table 1. As shown in Table 1, tracking of these organic BD-R discs 1 could not be performed.

The sum n+k of the refractive index n and the extinction coefficient k of the organic BD-R discs 1 before recording was 2.11, 2.23, and 2.15, and the PP amplitude $V_1$ [V] was 0.19 [V], 0.14 [V], and 0.18 [V], respectively. These results cannot satisfy the above-mentioned relationship of n+k<2.1 for satisfying $V_0$ [V]≧0.20 [V]. The degree of modulation was 0.44, 0.42, and 0.45, respectively.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of manufacturing a write-once optical information recording medium, comprising:
providing a disc-shaped substrate having a spiral or ring-shaped guiding groove disposed on a surface thereon;
forming a light reflective layer on the surface of the substrate having the guiding groove;
forming an optical recording layer made of an organic dye material on the light reflective layer, wherein the optical recording layer has a refractive index n in the range of about 1.2 to about 2.1 and an extinction coefficient k in the range of about 0.01 to about 0.7, and n+k is in the range of about 1.4 to about 2.1, said organic dye material being selected using as a criteria a push-pull amplitude $V_1$[V] measured using a reproduction power of a main beam of 3 beams of a short-wavelength laser beam of 0.25 mW after a detected signal passes through a low-pass filter of 30 kHz, said selected organic dye material satisfying $V_1$[V]≧0.2[V];
forming a protective layer on the optical recording layer; and
bonding a cover layer to the protective layer.

2. The method according to claim 1, wherein the optical recording layer comprises an organic dye material film, and the optical density (OD value) of the optical recording layer at the absorption maximum wavelength is about 0.3 or less.

3. The method according to claim 1, wherein the write-once optical information recording medium can be written to and read from using a short-wavelength laser beam having a wavelength in the range of about 350 to about 500 nm.

4. The method according to claim 1, wherein the optical recording layer is formed such that a thickness of the optical recording layer is less than about 55 nm.

5. The method according to claim 4, wherein the optical recording layer is formed such that a thickness of the optical recording layer on the groove is about 35 nm and a thickness of the optical recording layer on the land is about 15 nm.

6. The method according to claim 1, wherein the organic dye material comprises an azo-metal chelate dye.

7. The method according to claim 1, wherein the organic dye material comprises a coumarin dye.

8. The method according to claim 1, wherein the organic dye material comprises a squarylium dye.

9. The method according to claim 1, wherein the organic dye material comprises an azo dye.

10. The method according claim 1, wherein the organic dye material comprises a cyanine dye.

11. The methon according to claim 1, wherein the selected organic dye material satisfies $0.31[V] \geqq V_1[V] \geqq 0.21[V]$.

* * * * *